Sept. 13, 1932.  M. G. CORSON  1,876,617
REFINING LEAD
Filed May 30, 1930
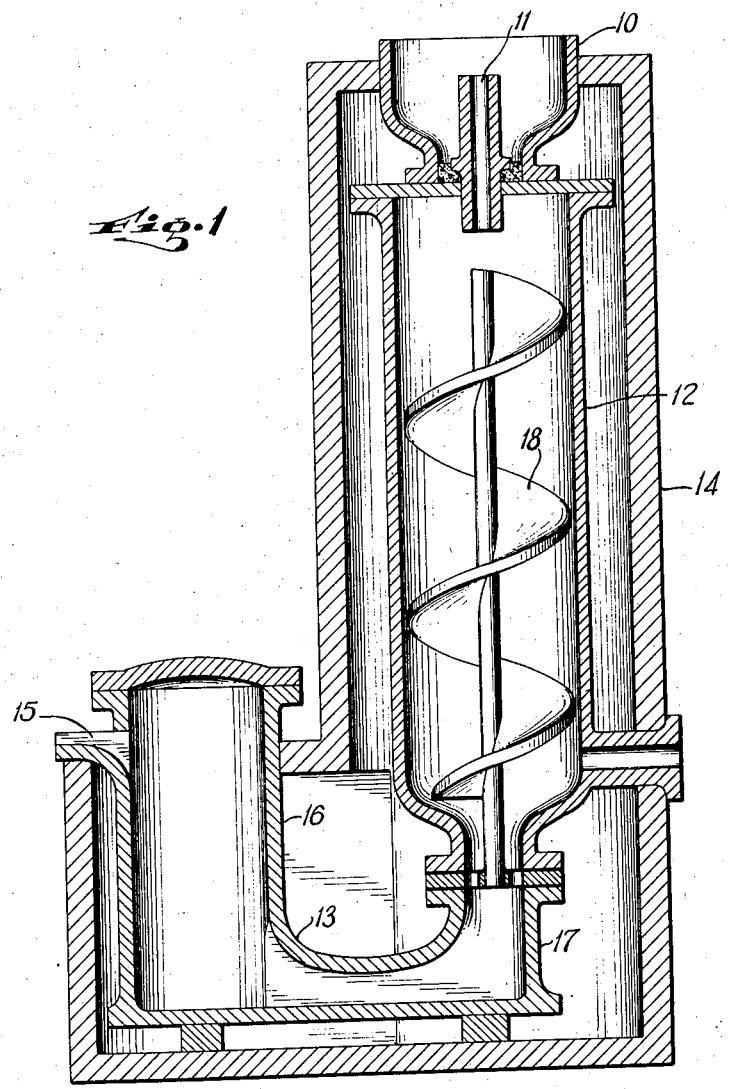
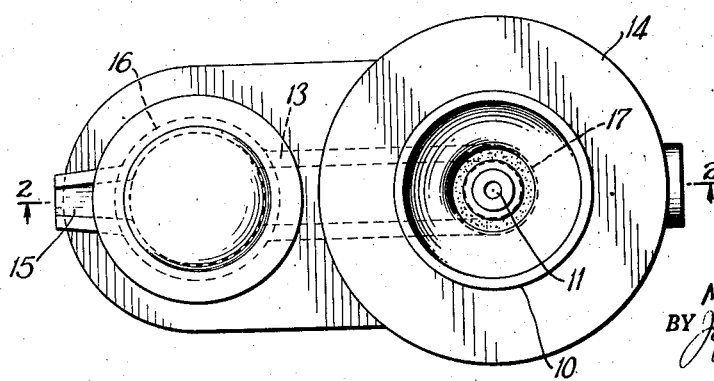
INVENTOR.
MICHAEL GEORGE CORSON
ATTORNEYS.

Patented Sept. 13, 1932

1,876,617

UNITED STATES PATENT OFFICE

MICHAEL GEORGE CORSON, OF JACKSON HEIGHTS, NEW YORK, ASSIGNOR TO NATIONAL LEAD COMPANY, A CORPORATION OF NEW JERSEY

REFINING LEAD

Application filed May 30, 1930. Serial No. 457,654.

The present invention relates to an improved method of refining lead by the action of molten aluminum.

The use of aluminum in refining lead is based upon its superior affinity to elements like copper, antimony, silver and zinc, only such elements as tin, cadmium and bismuth escaping its action.

However, prior attempts to employ aluminum in refining lead have not met with success owing to the difficulties that have been met with in producing intimate contact between molten aluminum and lead and to oxidation losses when the metals are mixed under the temperature conditions required to keep the mixture in a freely liquid condition. The use of stirrers and similar means for agitating the mixture has not helped, for such means make the method cumbersome and uneconomic and at the same time complicate the problem of separating the oxides formed at the exposed surface of the bath.

According to the present invention, the drawbacks of the prior methods are eliminated by taking advantage of difference in the specific gravity of lead and aluminum to bring about intimate contact between impure lead and a body of molten aluminum, and by a suitable arrangement of apparatus the operation may be carried on continuously over extended periods of time.

My method has the further advantage that the formation of dross may be entirely eliminated and at the same time the metals that are separated from the lead are recovered in the form of a useful aluminum-base alloy, from which they may be separated or which may be used as a master alloy in the production of various known aluminum-base alloys.

For a detailed description of the process and apparatus reference is made to the drawing in which:

Fig. 1 represents a vertical section taken on the line 2—2 of Fig. 2; and

Fig. 2 is a top plan view of the apparatus shown in Fig. 1.

Referring more particularly to the drawing, 10 is a receptacle into which the liquid impure lead is introduced, preferably in a continuous stream, and from which it runs through the elevated discharge 11 into a refining tower 12, which may be built of fused silica, sintered alumina, graphite or other suitable refractory material that is inert to the molten metals coming into contact therewith. This tower is adapted to contain a column of molten aluminum and is shown as superimposed upon and connected with a second receptacle 13, which is U-shaped in cross-section and adapted to contain a body of molten lead. The tower 12 and receptacle 13 are shown as enclosed within and spaced from refractory walls 14. The tower should be heated so as to maintain the molten aluminum at from 700–850° C., and likewise the receptacle 13 should be heated sufficiently to keep the pure lead contained therein in a freely flowing liquid condition. The heating means is not shown, but it will be understood that any suitable means may be employed, such for example as electric resistance, or if desired, a flame may be introduced directly into the space surrounding the tower and receptacle or combustion gases from a source of combustion, not shown, may be led to or circulated through such space. In operation the tower will be substantially filled with molten aluminum. The lead discharge conduit 11 is prolonged below the top of the tower 12, the prolongation serving to introduce the lead beneath the surface of the column of molten aluminum which fills the tower. This is an effective method of introducing molten lead without admitting air. The column of aluminum in tower 12 is supported directly by a body of pure lead contained in the receptacle 13. The receptacle 13 is provided with a discharge outlet 15 near the upper end of the leg 16. The lengths of the tower 12 and of the leg 16 are so proportioned as to make it possible to keep the column of molten aluminum in a state of hydrostatic equilibrium by means of the difference between the levels of the molten lead in the leg 16 and the leg 17 of the receptacle 13.

During the passage of the impure lead downwardly through the column of the molten aluminum in the tower 12 all of the copper, antimony, silver and zinc contained in it is taken up by the aluminum, the purified lead passing out into the receptacle 13 from which it is tapped out through the outlet 15 into molds of any desired shape.

In order to insure a longer contact between and more intimate mixing of the lead and molten aluminum in the tower 12, suitable means for lengthening the path of the lead through the column of aluminum may be provided. In the drawing I have shown a helix 18 vertically disposed in the tower 12. It will be understood that other forms of baffling means may be used, and if desired suitable means for producing stirring of the body of aluminum may be provided.

With an arrangement such as that shown in the apparatus above described, operations may be carried on continuously over an extended period of time, the only limitation being that eventually the molten aluminum will become so saturated with the metal impurities removed from the lead as to require tapping off and the introduction of a fresh charge of pure aluminum. When this is necessary the saturated aluminum may be withdrawn through the outlet 19 and a new charge of molten aluminum introduced through the receptacle 10 and opening 11.

The impure lead is preferably introduced to the receptacle 10 in a somewhat superheated condition in order to insure against cooling of the lead-aluminum mixture to a point where solidification will take place. It is desirable, however, to keep this degree of superheat as low as possible, since the tendency of the lead to oxidize while being poured into the receptacle 10 is thus minimized. This can be accomplished by correspondingly superheating the aluminum in the tower 12.

It is to be understood that various modifications in the proportions and construction of the apparatus may be made without departing from the spirit of the invention, which is not to be deemed as limited except as indicated in the appended claim.

I claim:

In the refining of lead, the process which comprises establishing and maintaining a column of molten aluminum of substantial height resting on a supporting bath of molten lead, continuously introducing molten lead to be refined beneath the surface of the molten aluminum with exclusion of air, passing the so introduced lead in a circuitous path through the said column of molten aluminum and continuously withdrawing the refined lead from beneath the column of molten aluminum.

Signed at 3436 76 Street, Jackson Heights, in the county of Queens and State of New York this 17th day of May A. D. 1930.

MICHAEL GEORGE CORSON.